(12) United States Patent
Then et al.

(10) Patent No.: US 8,269,431 B2
(45) Date of Patent: Sep. 18, 2012

(54) METHOD AND APPARATUS FOR PRODUCING LINEARIZED OPTICAL SIGNALS

(75) Inventors: Han Wui Then, Hillsboro, OR (US); Milton Feng, Champaign, IL (US); Nick Holonyak, Jr., Urbana, IL (US)

(73) Assignee: The Board of Trustees of The University of Illinois, Urbana, IL (US)

( * ) Notice: Subject to any disclaimer, the term of this patent is extended or adjusted under 35 U.S.C. 154(b) by 292 days.

(21) Appl. No.: 12/802,439

(22) Filed: Jun. 7, 2010

(65) Prior Publication Data

US 2010/0315018 A1 Dec. 16, 2010

Related U.S. Application Data

(60) Provisional application No. 61/268,686, filed on Jun. 15, 2009.

(51) Int. Cl.
 *H04B 10/12* (2006.01)
 *H04B 10/02* (2006.01)
 *H04B 10/00* (2006.01)
 *H05B 37/02* (2006.01)

(52) U.S. Cl. ............... 315/307; 315/149; 250/214 R

(58) Field of Classification Search .......... 315/307, 315/291, 246, 149; 250/214 A, 214 R, 214 C; 372/43.01, 30; 330/149
See application file for complete search history.

(56) References Cited

U.S. PATENT DOCUMENTS

| | | | |
|---|---|---|---|
| 7,091,082 B2 | 8/2006 | Feng et al. | 438/235 |
| 7,286,583 B2 | 10/2007 | Feng et al. | 372/30 |
| 7,354,780 B2 | 4/2008 | Feng et al. | 257/292 |
| 7,535,034 B2 | 5/2009 | Walter et al. | 372/43 |
| 7,711,015 B2 | 5/2010 | Holonyak et al. | 372/11 |
| 7,813,396 B2 | 10/2010 | Feng et al. | 372/43.01 |
| 8,005,124 B2 * | 8/2011 | Then et al. | 372/46.011 |
| 2003/0011040 A1 | 1/2003 | Bosco et al. | 257/517 |
| 2005/0040432 A1 | 2/2005 | Feng et al. | 257/198 |
| 2005/0054172 A1 | 3/2005 | Feng et al. | 438/313 |
| 2005/0105642 A1 | 5/2005 | Muller et al. | 375/296 |
| 2006/0208290 A1 | 9/2006 | Feng et al. | 257/292 |
| 2007/0252651 A1 | 11/2007 | Gao et al. | 330/302 |
| 2009/0134939 A1 | 5/2009 | Feng et al. | 327/581 |
| 2010/0034228 A1 | 2/2010 | Holonyak et al. | 374/45 |
| 2010/0073086 A1 * | 3/2010 | Holonyak et al. | 330/149 |

(Continued)

OTHER PUBLICATIONS

Light-Emitting Transistor: Light Emission From InGaP/GaAs Heterojunction Bipolar Transistors, M. Feng, N. Holonyak, Jr., and W. Hafez, Appl. Phys. Lett. 84, 151 (2004).

(Continued)

*Primary Examiner* — Daniel D Chang
(74) *Attorney, Agent, or Firm* — Martin Novack

(57) ABSTRACT

A method for producing an optical output in substantially linear relationship with an input electrical AC signal, including the following steps: providing a light-emitting transistor having emitter, base, and collector regions, the light-emitting transistor producing light emission from its base region in response to electrical signals applied with respect to the emitter, base, and collector regions; applying a signal derived from the input signal to the light-emitting transistor; deriving a feedback signal from an electrical operating signal of the light-emitting transistor; applying a predistortion factor to the derived feedback signal to produce a predistorted feedback signal; and combining the predistorted feedback signal with the input signal to produce the signal derived from thr input signal; whereby the light emission comprises an optical output in substantially linear relationship with the input signal.

24 Claims, 9 Drawing Sheets

U.S. PATENT DOCUMENTS

2010/0103971 A1   4/2010   Then et al. ............. 372/45.01

OTHER PUBLICATIONS

Quantum-Well-Base Heterojunction Bipolar Light-Emitting Transistor, M. Feng, N. Holonyak, Jr., and R. Chan, Appl. Phys. Lett. 84, 1952 (2004).
Type-II GaAsSb/InP Heterojunction Bipolar Light-Emitting Transistor, M. Feng, N. Holonyak, Jr., B. Chu-Kung, G. Walter, and R. Chan, Appl. Phys. Lett. 84, 4792 (2004).
Laser Operation of a Heterojunction Bipolar Light-Emitting Transistor, G. Walter, N. Holonyak, Jr., M. Feng, and R. Chan, Appl. Phys. Lett. 85, 4768 (2004).
Microwave Operation and Modulation of a Transistor Laser, R. Chan, M. Feng, N. Holonyak, Jr., and G. Walter, Appl. Phys. Lett. 86, 131114 (2005).
Room Temperature Continuous Wave Operation of a Heterojunction Bipolar Transistor Laser, M. Feng, N. Holonyak, Jr., G. Walter, and R. Chan, Appl. Phys. Lett. 87, 131103 (2005).
Visible Spectrum Light-Emitting Transistors, F. Dixon, R. Chan, G. Walter, N. Holonyak, Jr., M. Feng, X. B. Zhang, J. H. Ryou, and R. D. Dupuis, Appl. Phys. Lett. 88, 012108 (2006).
The Transistor Laser, N. Holonyak, M Feng, Spectrum, IEEE vol. 43, Issue 2, Feb. 2006.
Signal Mixing in a Multiple Input Transistor Laser Near Threshold, M. Feng, N. Holonyak, Jr., R. Chan, A. James, and G. Walter, Appl. Phys. Lett. 88, 063509 (2006).
Collector Current Map of Gain and Stimulated Recombination on the Base Quantum Well Transitions of a Transistor Laser, R. Chan , N. Holonyak, Jr. , A. James , G. Walter, Appl. Phys. Lett. 88, 143508 (2006).
Collector Breakdown in the Heterojunction Bipolar Transistor laser, G. Walter, A. James, N. Holonyak, Jr., M. Feng, and R. Chan, Appl. Physics Lett. 88, 232105 (2006).
High-Speed ($\geq$1 GHz) Electrical and Optical Adding, Mixing, and Processing of Square-Wave Signals With a Transistor Laser, M. Feng, N. Holonyak, Jr., R. Chan, A. James, and G. Walter, IEEE Photonics Technology Lett., vol. 18, No. 11, Jun. 1, 2006.
Graded-Base InGaN/GaN Heterojunction Bipolar Light-Emitting Transistors, B.F. Chu-Kung, M. Feng, G. Walter, and J. Holonyak, Jr. et al., Appl. Physics Lett. 89, 082108 (2006).
Carrier Lifetime and Modulation Bandwidth of a Quantum Well AlGaAs/InGaP/GaAs/InGaAs Transistor Laser, M. Feng, N. Holonyak, Jr., A. James, K. Cimino, G. Walter, and R. Chan, Appl. Phys. Lett 89, 113504 (2006).
Chirp in a Transistor Laser: Franz-Keldysh Reduction of the Linewidth Enhancement, G. Walter, A. James, N. Holonyak, Jr., and M. Feng, App. Phys. Lett. 90, 091109 (2007).
Photon-Assisted Breakdown, Negative Resistance, and Switching in a Quantum-Well Transistor Laser, A. James, G. Walter, M. Feng, and N. Holonyak, Jr., Appl. Phys. Lett. 90, 152109 (2007).
Franz—Keldysh Photon-Assisted Voltage-Operated Switching of a Transistor Laser, A. James, N. Holonyak, M. Feng, and G. Walter, Photonics Technology Letters, IEEE Volume: 19 Issue: 9 (2007).
Experimental Determination of the Effective Minority Carrier Lifetime in the Operation of a Quantum-Well n-p-n Heterojunction Bipolar Light-Emitting Transistor of Varying Base Quantum-Well Design and Doping; H.W. Then, M. Feng, N. Holonyak, Jr., and C. H. Wu, Appl. Phys. Lett. 91, 033505 (2007).
Charge Control Analysis of Transistor Laser Operation, M. Feng, N. Holonyak, Jr., H. W. Then, and G. Walter, Appl. Phys. Lett. 91, 053501 (2007).
Optical Bandwidth Enhancement by Operation and Modulation of the First Excited State of a Transistor Laser, H. W. Then, M. Feng, and N. Holonyak, Jr., Appl. Phys. Lett. 91, 183505 (2007).
Modulation of High Current Gain ($\beta$>49) Light-Emitting InGaN/GaN Heterojunction Bipolar Transistors, B. F. Chu-Kung, C. H. Wu, G. Walter, M. Feng, N. Holonyak, Jr., T. Chung, J.-H. Ryou, and R. D. Dupuis, Appl. Phys. Lett. 91, 232114 (2007).
Collector Characteristics and the Differential Optical Gain of a Quantum-Well Transistor Laser, H. W. Then, G. Walter, M. Feng, and N. Holonyak, Jr., Appl. Phys. Lett. 91, 243508 (2007).
InAlGaAs/InP Light-Emitting Transistors Operating Near 1.55 µm, Yound Huang, Xue-Bing Zhang, Jae-Hyun Ryun, Russell D. Dupuis, Forest Dixon, Nick Holonyak, Jr., and Milton Feng., J. Appl. Phys. 103 114505 (2008).
Transistor Laser With Emission Wavelength at 1544 nm, F. Dixon, M. Feng, N. Holonyak, Jr., Yong Huang, X. B. Zhang, J. H. Ryou, and R. D. Dupuis, Appl. Phys. Lett. 93, 021111 (2008).
Optical Bandwidth Enhancement of Heterojunction Bipolar Transistor Laser Operation With an Auxiliary Base Signal, H.W. Then, G. Walter, M. Feng, and N. Holonyak, Jr., Appl. Phys. Lett. 93, 163504 (2008).
Bandwidth Extension by Trade-Off of Electrical and Optical Gain in a Transistor Laser: Three-Terminal Control, H. W. Then, M. Feng, and N. Holonyak, Jr., Appl. Phys. Lett. 94, 013509 (2009).
Tunnel Junction Transistor Laser, M. Feng, N. Holonyak, Jr., H. W. Then, C. H. Wu, and G. Walter, Appl. Phys. Lett. 94, 041118 (2009).
Electrical-Optical Signal Mixing and Multiplication (2$\rightarrow$22 GHz) With a Tunnel Junction Transistor Laser, H. W. Then, C. H. Wu, G. Walter, M. Feng, and N. Holonyak, Jr., Appl. Phys. Lett. 94, 101114 (2009).
Scaling of Light Emitting Transistor for Multigigahertz Optical Bandwidth, C. H. Wu, G. Walter, H. W. Then, M. Feng, and N. Holonyak, Jr., Appl. Phys. Lett. 94, 171101 (2009).
Device Performance of Light Emitting Transistors With C-Doped and Zn-Doped Base Layers, Huang, Y., Ryou, J.-H., Dupuis, R.D., Dixon, F., Holonyak, N., Feng, M., Indium Phosphide & Related Materials, 2009; IPRM '09. IEEE International Conference, May 10-14, 2009, pp. 387-390.
Tilted-Charge High Speed (7 GHz) Light Emitting Diode, G. Walter, C. H. Wu, H. W. Then, M. Feng, and N. Holonyak, Jr., Appl. Phys. Lett. 94, 231125 (2009).

* cited by examiner

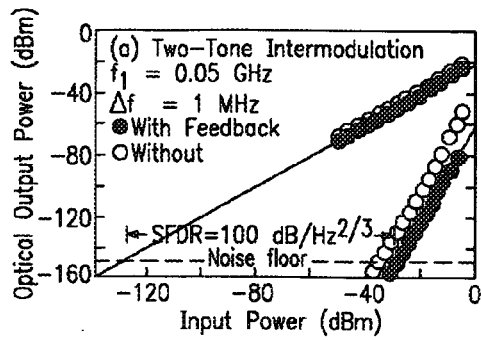
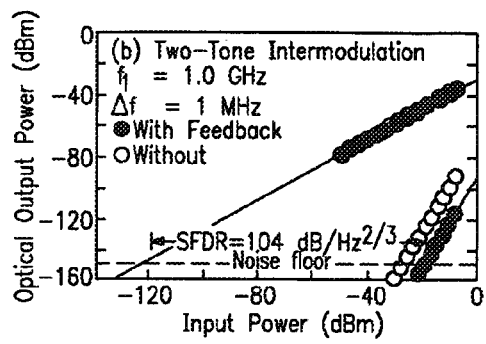
FIG. 13a  FIG. 13b
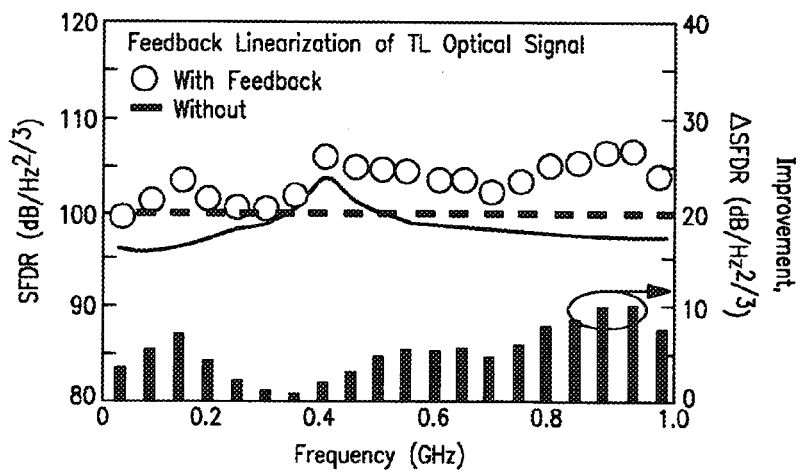
FIG. 14

METHOD AND APPARATUS FOR PRODUCING LINEARIZED OPTICAL SIGNALS

PRIORITY CLAIM

Priority is claimed from U.S. Provisional Patent Application No. 61/268,686, filed Jun. 15, 2009, and said Provisional Patent Application is incorporated herein by reference.

FIELD OF THE INVENTION

This invention relates to generation of linearized optical signals, such as for optical communication or other purpose, using a light-emitting transistor or transistor laser.

BACKGROUND OF THE INVENTION

Microwave photonic links require linear optical transmitters in order to achieve high dynamic range (typically characterized by the Spurious Free Dynamic Range or SFDR). Current optical transmitters based on directly modulated diode lasers or external modulators such as Mach-Zehnder modulators and EA (Electroabsorption) modulators, employ elaborate feedforward as well as feedback linearization techniques in order to suppress signal harmonics due to the non-linearity of diode lasers (in the case of direct modulation) and that of external modulators. Examples of such techniques are shown in FIGS. 1 and 2.

FIG. 1 illustrates an example of a feedforward dual external modulators technique. In FIG. 1, the output of diode laser 105 is coupled, by coupler 110, to an upper branch that includes polarization controller 121 and external modulator 1, which may conventionally be, for example, a mach zender modulator or an electroabsorption modulator. The modulator 1 receives an RF modulating input and bias control from a modulator bias control circuit 125. The diode laser output is also coupled, by the coupler 110, to a lower branch that includes polarization controller 131 and external modulator 2, which, again, may conventionally be a respective mach zender modulator or an electroabsorption modulator. The modulator 2 receives the RF modulating input via variable gain circuit 133, and bias control from a modulator bias control circuit 135. The outputs of the external modulators are combined by coupler 140 to produce the linearized optical output. Appropriate fiber delays are also represented in the diagram.

FIG. 2 illustrates an example of a feedforward direct modulation technique. In FIG. 2, an electrical input, such as an RF input, is split by a microwave splitter 255, one output of which is coupled to a diode laser 260, and the other output of which is coupled, via an electrical delay, to the positive input of a 180 degree hybrid coupler 270. The optical output of diode laser 260 is coupled by coupler 262 to a photodetector 275, the electrical output of which is, in turn, coupled via variable gain circuit 277, to the negative input terminal of 180 degree hybrid coupler 270. The output of coupler 270 is coupled, via an electrical delay, to another variable gain circuit 278 whose output is coupled to another diode laser 280. Another optical coupler 263 receives the output of diode laser 280 and also receives, via a fiber delay, the output of diode laser 260, and the coupler 263 combines these optical signals to produce the desired linearized optical output.

FIG. 3 illustrates an example of a feedback linearization technique. A diode laser 310, under control of a bias control circuit 305, produces an optical output that is coupled to an external modulator 320, for example of the mach-zehnder type. In this illustration, the modulator 320 receives an RF input, which may be predistorted. The optical output of modulator 320 is coupled, by optical coupler 330, to photo-diode 340, whose output controls a modulator bias control circuit 350 which, in turn, provides bias control to the modulator 320. The feedback controlled modulator output is the linearized optical output.

Regarding feedback linearization, as is evident in FIG. 3, feedback is provided by means of an external monitor photo-todiode. The signal is then used as an input to a control circuit which compensates for the distortion inherent in the diode laser output. This results in the need for couplers, and introduces unnecessary coupling losses in the feedback loop.

Feedback linearization techniques are common in optical sources based on directly modulated diode lasers or external modulators, such as the Mach-Zehnder modulator of FIG. 3. Feedback techniques are able to improve the SFDR to 100 dB/Hz$^{2/3}$ and above. (see, for example, Emcore data sheet, "Small Integrated Transmitter Unit SITU2400-3000", October 2007). However, linearization techniques based on diode lasers, due to its two-terminal limitation, requires a complex assembly of both active and passive components (for example, greater than 8 components per module) and consumes high power, for example in excess of 2 Watts. These solutions can be prohibitively expensive (for example, greater than $10K per transmitter module) and lack integration capability. In some cases, feedback is used in conjunction with predistortion technique to achieve better bandwidth performance. This again results in higher costs, complexity and power consumption.

It is among the objects of the invention to further improve feedback linearization techniques and systems.

SUMMARY OF THE INVENTION

An embodiment of a technique hereof for linearization of optical signals is based on transistor laser technology and is referred to as predistortion feedback linearization. The technique utilizes a signal derived from the electrical output (Port 2) of the transistor laser as a feedback signal to linearize its optical output (Port 3). A feature of this aspect of the invention is that the feedback signal is entirely electrical, and no optical signals are required as feedback. The transistor laser enables such implementation because of its three-port nature, which distinguishes it from a two-terminal diode lasers. Moreover, with an electrical instead of optical feedback, there is no optical-to-electrical conversion and coupling losses in the feedback loop, hence further enhancing the efficiency and advantages of the technique based on the transistor laser. Because a transistor laser is also inherently a transistor, it becomes possible to fabricate both traditional (2-port) transistors and transistor lasers on a single integrated chip. This capability enables the potential implementation of circuits based on the transistor laser monolithically on a single chip.

In accordance with an embodiment of the technique of the invention, a method is provided for producing an optical output in substantially linear relationship with an input electrical AC signal, including the following steps: providing a light-emitting transistor having emitter, base, and collector regions, said light-emitting transistor producing light emission from its base region in response to electrical signals applied with respect to said emitter, base, and collector regions; applying a signal derived from said input signal to said light-emitting transistor; deriving a feedback signal from an electrical operating signal of said light-emitting transistor; applying a predistortion factor to the derived feedback signal to produce a predistorted feedback signal; and combining said predistorted feedback signal with said input signal to produce said signal derived from said input signal; whereby said light emission comprises an optical output in substantially linear relationship with said input signal. The step of providing a light emitting transistor can comprise providing a transistor laser, so that the optical output comprises a laser output.

In a preferred embodiment of the method of the invention, the step of applying said predistortion factor comprises applying controllable gain or attenuation of said derived feedback signal. In a form of this embodiment, the step of applying said predistortion factor comprises applying controllable gain or attenuation of said derived feedback signal and applying controllable phase variation of said derived feedback signal. Also in this embodiment, the combining of said predistorted feedback signal with said input signal comprises subtracting said predistorted feedback signal from said input signal.

In an embodiment of the method of the invention, the step of deriving a feedback signal from an electrical operating signal of said light-emitting transistor comprises deriving an electrical current from said light-emitting transistor, and the step of deriving said feedback signal further comprises amplifying said electrical current derived from said light-emitting transistor. In a form of this embodiment, the step of providing a light-emitting transistor comprises providing a heterojunction bipolar light-emitting transistor, and the step of amplifying said electrical current comprises amplifying said current using at least one heterojunction bipolar transistor. This embodiment can further comprise forming said heterojunction bipolar light-emitting transistor and said at least one heterojunction bipolar transistor using a common semiconductor layer structure.

In accordance with a further embodiment of the invention, a feedback linearization apparatus is provided for producing an optical output in substantially linear relationship with an input electrical AC signal, comprising: a light-emitting transistor having emitter, base, and collector regions, said light-emitting transistor being operative to produce light emission from its base region in response to electrical signals applied with respect to said emitter, base, and collector regions; a difference circuit, which receives, as its positive input, said input signal, and as its negative input, a predistorted feedback signal, the output of said difference circuit being applied to said light-emitting transistor; and a feedback circuit responsive to an electrical operating signal of said light emitting transistor for producing said predistorted feedback signal; whereby said light emission comprises an optical output in substantially linear relationship with said input signal. In a form of this embodiment, the light emitting transistor is a laser transistor having an optical resonant cavity enclosing at least a portion of said base region, and wherein said light emission comprises laser emission. In this embodiment, the feedback circuit is operative to produce said predistorted feedback signal as a version of said electrical operating signal to which predetermined gain or attenuation control and predetermined phase control has been applied.

Further features and advantages of the invention will become more readily apparent from the following detailed description when taken in conjunction with the accompanying drawings.

BRIEF DESCRIPTION OF THE DRAWINGS

FIG. 10($b$) illustrates operation of TL linearization of an optical signal using predistortion feedback. The frequency component diagrams show, for this example, the reduction in the intermodulation products (nonlinearities) at $2f_1-f_2$ and $2f_2-f_1$ as the result of feeding back the signal, S2 of appropriate magnitude and phase into the transistor laser.

FIGS. 13$a$ and 13$b$ show two-tone simulation results for two-tone intermodulation (IMD) products at (a) 50 MHz, and (b) 1.0 GHz, comparing the results with and without linearization feedback. Noise floor is set at −150 dBm/Hz. The SFDRs of greater than or equal to 100 dB/Hz$^{2/3}$ shown in (a) and (b) are achieved with linearization feedback. Without feedback, the SFDRs are 96 and 97 dB/Hz$^{2/3}$ respectively.

FIG. 14 is a graph showing Spurious Free Dynamic Range (SFDR) of TL optical output signals with and without feedback linearization. With feedback linearization, the SFDR is improved to above the goal of 100 dB/Hz$^{2/3}$. The extent of improvement in SFDR with feedback linearization is shown in bar graph form at the bottom of the plot.

DETAILED DESCRIPTION

Figure 1:
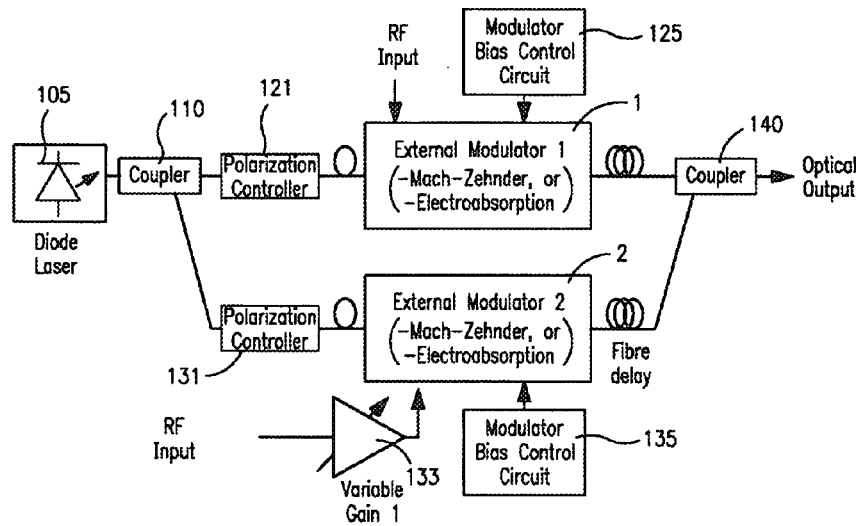
FIG. 1 shows an example of a system for implementing a known method for optical feedforward linearization of an optical output using a dual external modulators technique.
Figure 2:
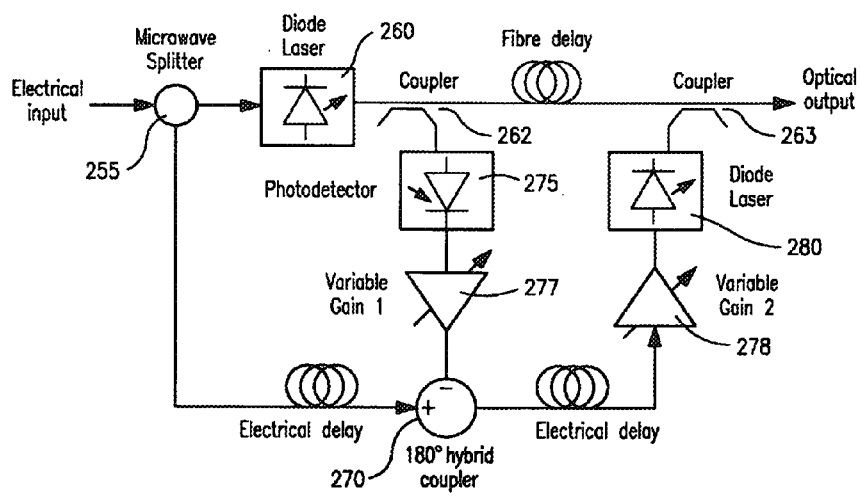
FIG. 2 shows an example of a system for implementing a known method for optical feedforward linearization of an optical output using a feedfoward direct modulation technique.
Figure 3:
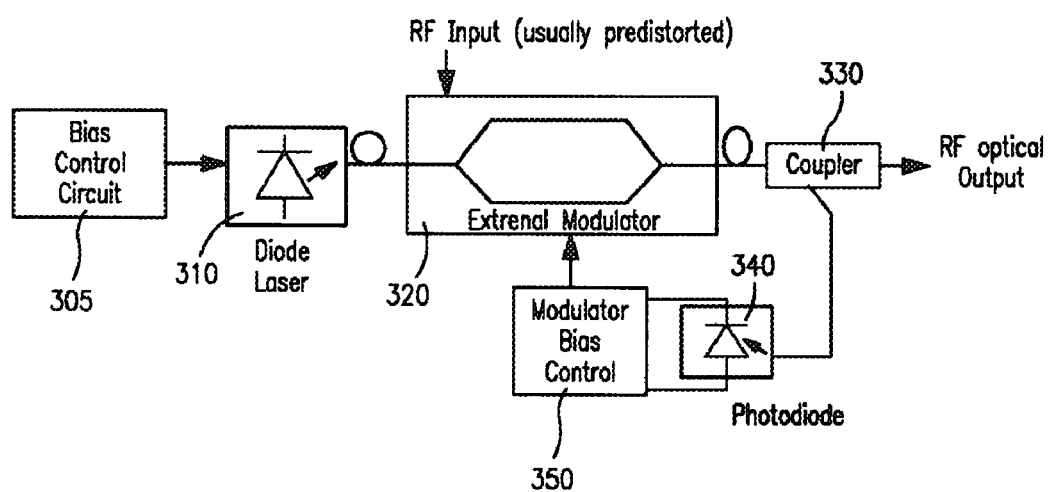
FIG. 3 shows a system for implementing a known method for linearization of an optical output using a feedback technique.

Embodiments of the present invention utilize heterojunction bipolar transistors which operate as light-emitting transistors and laser transistors. Reference can be made for example, to U.S. Pat. Nos. 7,091,082, 7,286,583, 7,297,589, 7,354,780 7,535,034 and 7,693,195; U.S. Patent Application Publication Numbers US2005/0040432, US2005/0054172, US2008/0240173, US200910134939, and US2010/

0034228; and to PCT International Patent Publication Number WO/2005/020287, published Mar. 3, 2005, and PCT International Patent Publication Number WO/2006/006879 published Aug. 9, 2006; all the foregoing being assigned to the same assignee as the present Application. Reference can also be made, for example, to the following publications: Light-Emitting Transistor: Light Emission From InGaP/GaAs Heterojunction Bipolar Transistors, M. Feng, N. Holonyak, Jr., and W. Hafez, Appl. Phys. Lett. 84, 151 (2004); Quantum-Well-Base Heterojunction Bipolar Light-Emitting Transistor, M. Feng, N. Holonyak, Jr., and R. Chan, Appl. Phys. Lett. 84, 1952 (2004); Type-II GaAsSb/InP Heterojunction Bipolar Light-Emitting Transistor, M. Feng, N. Holonyak, Jr., B. Chu-Kung, G. Walter, and R. Chan, Appl. Phys. Lett. 84, 4792 (2004); Laser Operation Of A Heterojunction Bipolar Light-Emitting Transistor, G. Walter, N. Holonyak, Jr., M. Feng, and R. Chan, Appl. Phys. Lett. 85, 4768 (2004); Microwave Operation And Modulation Of A Transistor Laser, R. Chan, M. Feng, N. Holonyak, Jr., and G. Walter, Appl. Phys. Lett. 86, 131114 (2005); Room Temperature Continuous Wave Operation Of A Heterojunction Bipolar Transistor Laser, M. Feng, N. Holonyak, Jr., G. Walter, and R. Chan, Appl. Phys. Lett. 87, 131103 (2005); Visible Spectrum Light-Emitting Transistors, F. Dixon, R. Chan, G. Walter, N. Holonyak, Jr., M. Feng, X. B. Zhang, J. H. Ryou, and R. D. Dupuis, Appl. Phys. Lett. 88, 012108 (2006); The Transistor Laser, N. Holonyak, M Feng, Spectrum, IEEE Volume 43, Issue 2, February 2006; Signal Mixing In A Multiple Input Transistor Laser Near Threshold, M. Feng, N. Holonyak, Jr., R. Chan, A. James, and G. Walter, Appl. Phys. Lett. 88, 063509 (2006); Collector Current Map Of Gain And Stimulated Recombination On The Base Quantum Well Transitions Of A Transistor Laser, R. Chan, N. Holonyak, Jr., A. James, G. Walter, Appl. Phys. Lett. 88, 143508 (2006); High-Speed (1 GHz) Electrical And Optical Adding, Mixing, And Processing Of Square-Wave Signals With A Transistor Laser, Milton Feng; N. Holonyak, Jr.; R. Chan; A. James; G. Walter, Photonics Technology Letters, IEEE Volume: 18 Issue: 11 (2006); Graded-Base InGaN/GaN Heterojunction Bipolar Light-Emitting Transistors, B. F. Chu-Kung et al., Appl. Phys. Lett. 89, 082108 (2006); Carrier Lifetime And Modulation Bandwidth Of A Quantum Well AlGaAs/InGaP/GaAs/InGaAs Transistor Laser, M. Feng, N. Holonyak, Jr., A. James, K. Cimino, G. Walter, and R. Chan, Appl. Phys. Lett. 89, 113504 (2006); Chirp In A Transistor Laser, Franz-Keldysh Reduction Of The Linewidth Enhancement, G. Walter, A. James, N. Holonyak, Jr., and M. Feng Appl. Phys. Lett. 90, 091109 (2007); Photon-Assisted Breakdown, Negative Resistance, And Switching In A Quantum-Well Transistor Laser, A. James, G. Walter, M. Feng, and N. Holonyak, Jr., Appl. Phys. Lett. 90, 152109 (2007); Franz-Keldysh Photon-Assisted Voltage-Operated Switching Of A Transistor Laser, James, A.; Holonyak, N.; Feng, M.; Walter, G., Photonics Technology Letters, IEEE Volume: 19 Issue: 9 2007; Experimental Determination Of The Effective Minority Carrier Lifetime In The Operation Of A Quantum-Well n-p-n Heterojunction Bipolar Light-Emitting Transistor Of Varying Base Quantum-Well Design And Doping, H. W. Then, M. Feng, N. Holonyak, Jr., and C. H. Wu, Appl. Phys. Lett. 91, 033505 (2007); Charge Control Analysis Of Transistor Laser Operation, M. Feng, N. Holonyak, Jr., H. W. Then, and G. Walter, Appl. Phys. Lett. 91, 053501 (2007); Optical Bandwidth Enhancement By Operation And Modulation Of The First Excited State Of A Transistor Laser, H. W. Then, M. Feng, and N. Holonyak, Jr., Appl. Phys. Lett. 91, 183505 (2007); Modulation Of High Current Gain ($\beta$>49) Light-Emitting InGaN/GaN Heterojunction Bipolar Transistors, B. F. Chu-Kung, C. H. Wu, G. Walter, M. Feng, N. Holonyak, Jr., T. Chung, J.-H. Ryou, and R. D. Dupuis, Appl. Phys. Lett. 91, 232114 (2007); Collector Characteristics and The Differential Optical Gain Of A Quantum-Well Transistor Laser, H. W. Then, G. Walter, M. Feng, and N. Holonyak, Jr., Appl. Phys. Lett. 91, 243508 (2007); and Transistor Laser With Emission Wavelength At 1544 nm, F. Dixon, M. Feng, N. Holonyak, Jr., Yong Huang, X. B. Zhang, J. H. Ryou, and R. D. Dupuis, Appl. Phys. Lett. 93, 021111 (2008).

Figure 4:
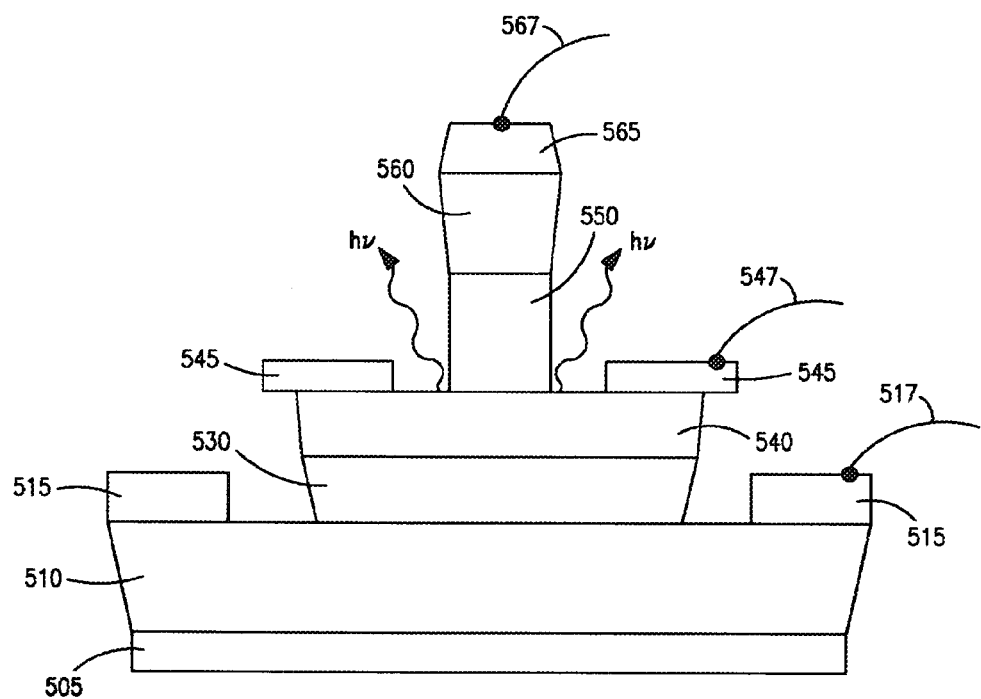
FIG. 4 is a simplified cross-sectional diagram, not to scale, of a light-emitting transistor or laser transistor, as described in referenced PCT International Patent Application Publications.

FIG. 4 illustrates a light emitting transistor device of a type described in PCT International Patent Application Publication WO/2005/020287 and in PCT International Patent Application Publication WO/2006/093883, both of these PCT Published International Patent Applications being incorporated herein by reference. A substrate 505 has the following layers disposed thereon: subcollector 510, n-type GaAs collector 530, 600 Angstrom p+ compositionally graded InGaAs base 540, n-type InGaP emitter 550, and cap layer 560. Also shown are collector metallization (or electrode) 515, base metallization 545, and emitter metallization 565. Collector lead 517, base lead 547, and emitter lead 567 are also shown. As described in the referenced PCT Published International Patent Applications, for conventional PN junction diode operation, the recombination process is based on both an electron injected from the n-side and a hole injected from the p-side, which in a bimolecular recombination process can be limited in speed. In the case of HBT light emission (as represented in FIG. 4 as light emission from base region 540) the base "hole" concentration is so high that when an electron is injected into the base, it recombines (bimolecular) rapidly. The base current merely re-supplies holes via relaxation to neutralize charge imbalance.

Figure 5:
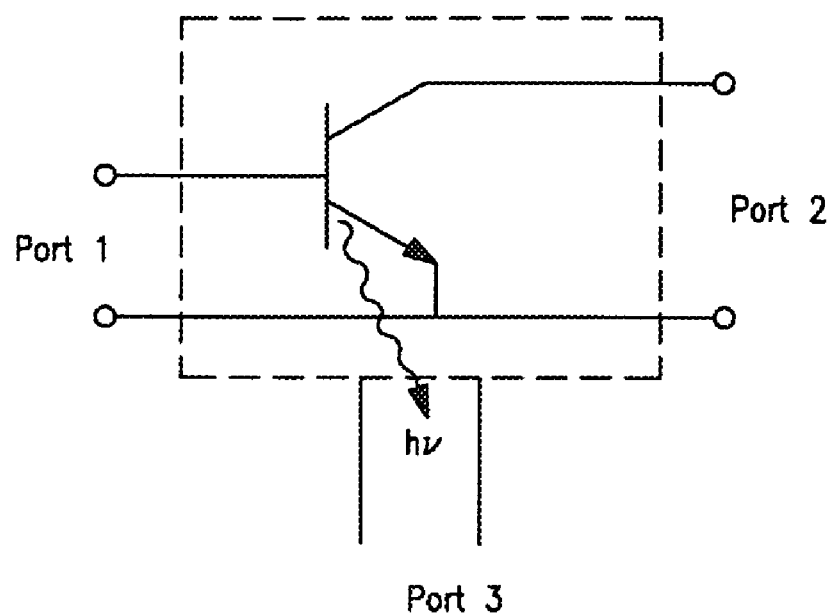
FIG. 5 is a simplified schematic diagram of a three port light-emitting transistor device as disclosed in the referenced PCT International Patent Application Publication WO/2005/020287.

As is also described in the referenced PCT International Patent Application Publications WO/2005/020287 and WO/2006/093883, in typical transistor operation, one of the three terminals of a transistor is common to both the input and output circuits. This leads to familiar configurations known as common emitter (CE), common base (CB), and common collector (CC). The common terminal (often ground reference) can be paired with one or the other of the two remaining terminals. Each pair is called a port, and two pairs for any of the configurations are called a two-port network. The two ports are usually identified as an input port and as an output port. As also described in the referenced PCT Published International Patent Applications, and as illustrated in FIG. 5, a third port, namely an optical output port, is provided, and is based on (recombination-radiation) emission from the base layer of the HBT light emitter. For the HBT of FIG. 4 operated, for example, with a common emitter configuration, when an electrical signal is applied to the input port (Port 1), there results simultaneously an electrical output with signal amplification at Port 2 and optical output with signal modulation of light emission at Port 3.

Figure 6:
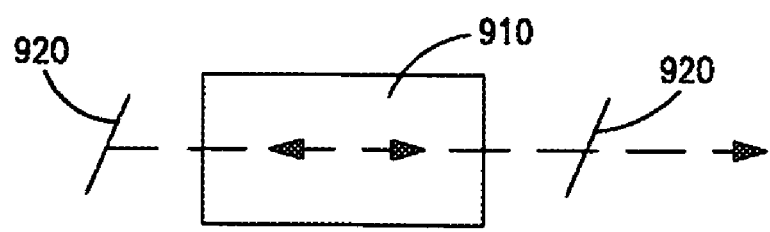
FIG. 6 illustrates reflectors used in a bipolar transistor laser device as disclosed in the referenced PCT International Patent Application Publication WO/2005/020287.

As further described in the referenced PCT International Patent Application Publications WO/2005/020287 and WO/2006/093883, FIG. 6 illustrates the three terminal light emitting HBT, 910, in a lateral optically resonant cavity, represented at 920, for operation, for example, as a lateral gain guided laser. The lateral cavity may be defined, for example, by cleaved edges on or near the light emitting region. As further described in the referenced PCT Published Patent Applications, and as will be understood throughout the present application, vertical cavity laser configurations can also be employed, using, for example, distributed Bragg reflectors (DBRs) as upper and lower optical cavity reflectors.

As also described in the referenced PCT International Patent Application Publications WO/2005/020287 and WO/2006/093883, stimulated emission can be employed to advantage in the base layer of a bipolar transistor (e.g. a bipolar junction transistor (BJT) or a heterojunction bipolar transistor (HBT), in order to enhance the speed of the transistor. Spontaneous emission recombination lifetime is a fundamental limitation of bipolar transistor speed. The base layer of a bipolar transistor is adapted to enhance stimulated emission (or stimulated recombination) to the detriment of spontaneous emission, thereby reducing recombination lifetime and increasing transistor speed. At least one layer exhibiting quantum size effects, preferably a quantum well or a layer of quantum dots, preferably undoped or lightly doped, is provided in the base layer of the bipolar transistor. Preferably, at least a portion of the base layer containing the at least one layer exhibiting quantum size effects, is highly doped, and of a wider bandgap material than said at least one layer. The at least one quantum well, or, for example, layer of quantum dots, within the higher gap highly doped material, enhances stimulated recombination and reduces radiative recombination lifetime. A two-dimensional electron gas ("2-DEG") enhances carrier concentration in the quantum well or quantum dot layer, thereby improving mobility in the base region. Improvement in base resistance permits reduction in base thickness, with attendant reduction of base transport time. These advantages in speed are applicable in high speed bipolar transistors in which light emission is utilized, and/or in high speed bipolar transistors in which light emission is not utilized. In light emitting bipolar transistor devices, for example heterojunction bipolar transistors of direct bandgap materials, the use of one or more layers exhibiting quantum size effects can also be advantageous in enhancing light emission and customizing the emission wavelength characteristics of the devices. Doped or highly doped quantum size regions can also be utilized.

Figure 7:
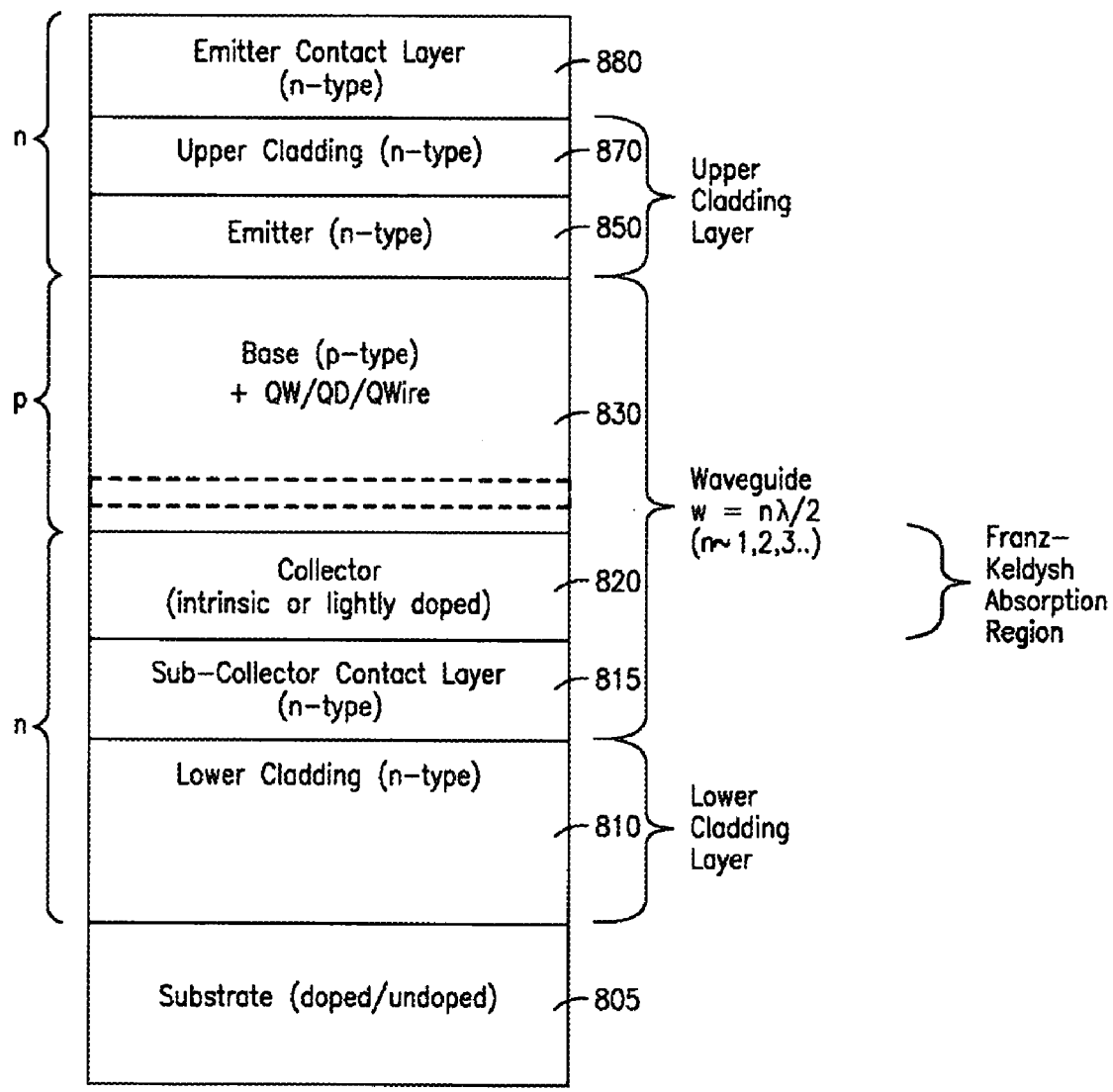
FIG. 7 is a diagram, not to scale, of the epitaxial layer structure of a type of device that can be utilized in practicing embodiments of the invention.

FIG. 7 shows the general epitaxial layers of a type of device that can be utilized in practicing embodiments and techniques hereof, and which can be modified to implement other embodiments and techniques hereof. Reference can also be made, for example, to copending U.S. Patent Application Publication Number US2008/0240173, assigned to the same assignee as the present Application. In the simplified device diagram of FIG. 7, a substrate, which may be doped or undoped, is represented at 805, and has the following layers disposed thereon. A lower cladding layer, which is n-type in this example (it being understood, throughout, that, where suitable, devices of opposite conductivity type can be employed), is represented at 810. Then, an n-type sub-collector contact layer is represented at 815, and an intrinsic or lightly doped n-type collector layer is represented at 820. Next, a p-type base region, which preferably exhibits quantum size effects (e.g. by virtue of its own dimensions and/or by inclusion of one or more quantum well(s) and/or layer(s) of quantum dots and/or quantum wires), is represented at 830. Disposed thereon are n-type emitter 850, n-type upper cladding 870, and an n-type emitter contact layer, represented at 880. Contacts and leads for application of signals are applied to the sub-collector contact layer 815, the base layer 830, and the emitter contact layer 880. For operation as a laser, an optical resonant cavity is provided, as previously set forth.

Figure 8:
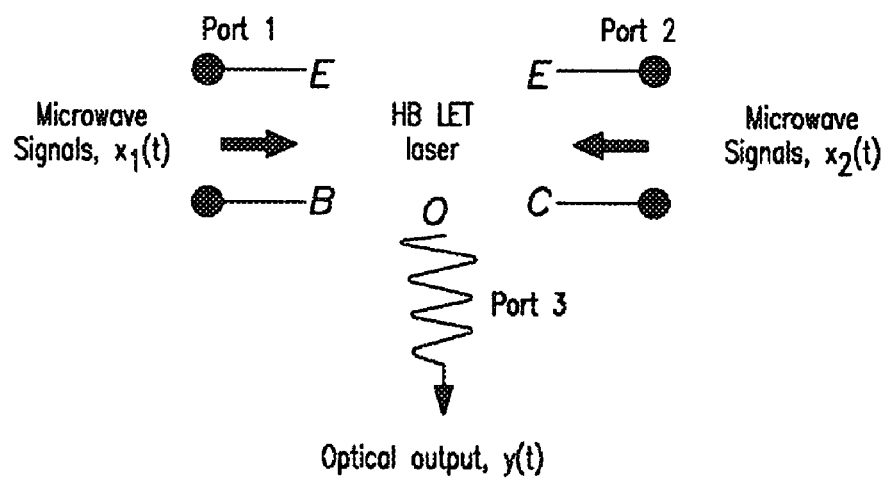
FIG. 8 shows a light-emitting transistor or a transistor laser in common emitter configuration, with two electrical input ports and an optical output port.

As has been described, the heterojunction bipolar light-emitting transistor (HBLET) is a three-port device (2 electrical ports and 1 optical port), which, when incorporated with a suitable photon resonator cavity, can operate in laser mode. As shown in FIG. 8, its optical output may be modulated, for example, by a microwave signal input to Electrical Port 1 or to Electrical Port 2, or concurrently to both Ports 1 and 2. The HBLET of FIG. 8 is represented as being in common-emitter configuration where Port 1 is the Base-Emitter and Port 2 is the Collector-Emitter. As also described herein, configurations, such as common-base and common-collector, are also realizable. The input to Port 1 is designated $x_2(t)$ and the input to Port 2 is designated $x_2(t)$.

Figure 9:
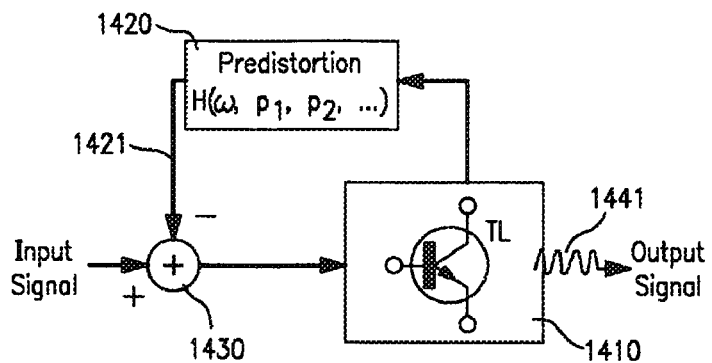
FIG. 9 is a functional block diagram of transistor laser linearization of optical signals using predistortion feedback, in accordance with an embodiment of the invention.

Embodiments hereof relate the improvement of feedback linearization techniques and systems. The goals of the pre-distortion feedback techniques hereof include linearization of the optical output of a transistor laser. Here, the feedback and predistortion mechanism are performed entirely in the electrical domain. A functional block diagram is shown in FIG. 9. In the block diagram, the transistor laser (TL) is represented at 1410. The optical output thereof is represented at 1411. An electrical output of the TL is fed back to predistortion circuit 1420, whose output is a signal represented at 1421. The signal 1421 is the negative input to difference circuit 1430, the positive input of which is the system input signal. In this implementation, the advantages of the transistor laser over diode lasers include: (i) Absence of optical-to-electrical conversion losses in the feedback loop. For diode lasers, the feedback signal has to be detected by a photodetector (electro-optical conversion). The responsivity of a non-ideal photodetector results in conversion losses, and the need to extract and couple light efficiently to photodetectors results in coupling losses. These optical losses may easily amount to more than 10 dB. (ii) Transistor laser based implementation enables an integrated approach on a single chip.

Figure 10A:
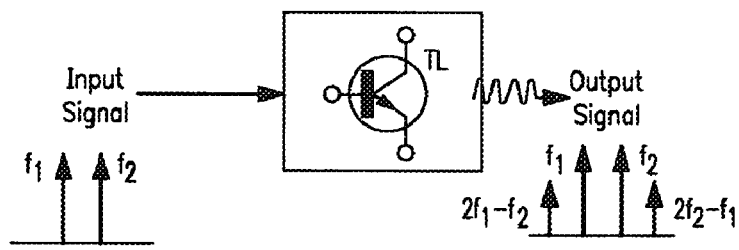
FIG. 10($a$) illustrates operation of a transistor laser (TL) without feedback. For this example, the optical output comprises signals at the two fundamental tones, $f_1$ and $f_2$, as well as the intermodulation products (nonlinearities) at $2f_1-f_2$ and $2f_2-f_1$.
Figure 10B:
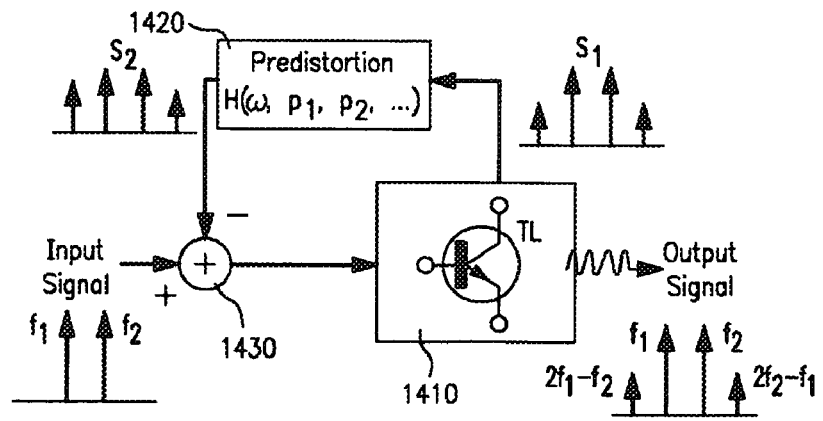

Predistortion feedback works by feeding back a close replica of the signal that needs to be linearized. The feedback signal does not need to be an exact replica. It just needs to be a function of the desired output signal. FIG. 10a illustrates operation of the TL without feedback. It is seen that for an input signal containing $f_1$, $f_2$, the output optical signal contains substantial intermodulation products (nonlinearites) at $2f_1-f_2$ and $2f_2-f_1$. FIG. 10b illustrates how predistortion feedback achieves linearization of the TL optical output by greatly reducing the intermodulation products. (No feedback based on a signal derived from a measured optical signal is necessary, and therein lies a key advantage of employing a three-terminal transistor laser.) The feedback signal, S1 (FIG. 10(b)) is predistorted by the nonlinear function, H(□), before it is sent back into the device. The combined response of the predistorted signal, S2 with the original input signal then reduces the intermodulation products in the output signal. The predistortion response, H(□, $p_1$, $p_2$, ...) is tuned by the parameters $\{p_i\}$ to achieve the desired effects. Examples of parameters that can be tuned are the bias current and voltage of the predistortion circuit, and its output gain (or attenuation) and phase.

The reduction in intermodulation products is usually accompanied by a reduction in the fundamental signals (frequencies $f_1$ and $f_2$). The inherent trade-off is typical of all negative feedback topology.

As an example of operation, a circuit model has been simulated. For this purpose, the following design considerations are noted: (i) preserve the ultimate goal of building a monolithic system-on-chip. (ii) the predistortion function is kept relatively simple for this example. To satisfy (i), a single transistor laser (TL) is employed as the optical transmitter, and a predistortion circuit is built from heterojunction bipolar transistors designed on the same material layer structure as the transistor laser. The output gain (or attenuation) and phase of the feedback loop are introduced as tuning parameters. It will be understood that there are other ways of implementing the feedback circuits hereof.

Figure 11:
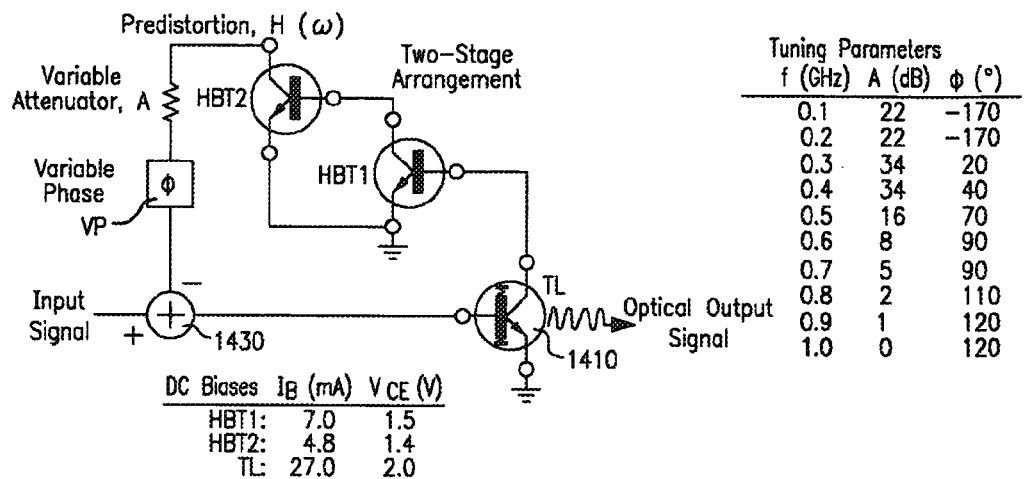
FIG. 11 is a schematic diagram of an embodiment of a circuit for feedback linearization with a transistor laser. For the simulation of this example, key component biases and parameters are tabulated in detail as shown as part of the Figure.

The circuit model for this example is shown in FIG. 11. Transistor laser 1401 and difference circuit 1430 are as in the diagrams of FIGS. 9 and 10(b). The feedback signal is "predistorted" by the nonlinear function, H(☐), comprising the electrical output of the TL and a two-stage HBT arrangement (including HBT1 and HBT2) with its signal strength and phase fine-tuned (by variable attenuator A, and variable phase circuit VP) before it is sent back into the device. The predistorted signal, together with the original input signal, operate to reduce the intermodulation products (IMD) in the output signal.

Figure 12:
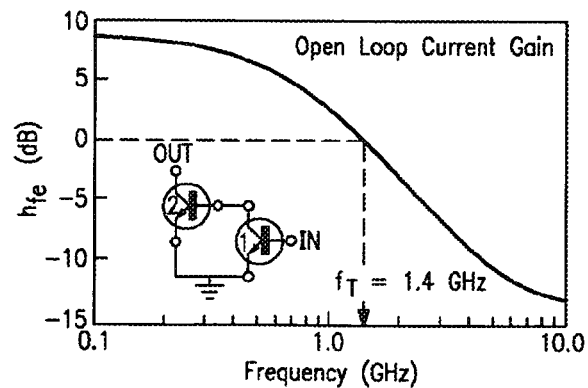
FIG. 12 is a graph showing the open loop current gain, $h_{fe}$, for an example, showing that $F_T$ is above 1.0 GHz.

The feedback loop preferably must provide an open loop gain greater than unity over the required operating range of frequencies (50 MHz-1.0 GHz) in order for any feedback network to perform as desired (see FIG. 12). This translates to the requirement of an open loop gain exhibiting a $f_T > 1.0$ GHz. In the present simulation, this requirement is achieved via the two-stage HBT arrangement of FIG. 11, shown again in the inset of the graph of FIG. 12.

To perform the simulation for third order two-tone intermodulation products (IMD), the input signal in FIG. 11 is replaced with a two-tone pure sinusoidal waveform of fundamental frequencies $f_1$ and $f_2 = f_1 + ☐f$. The simulation is carried out across the frequency range from 50 MHz to 1.0 GHz. The simulated results for the lowest (50 MHz) and highest (1.0 GHz) frequencies are shown in FIGS. 13(a) and 13(b), respectively.

FIG. 14 shows Spurious Free Dynamic Range (SFDR) of TL optical output signals with and without feedback linearization. The SFDR before any feedback linearization is below the specification of 100 dB/Hz$^{2/3}$ except across a narrow band of frequencies from 300-500 MHz. With the feedback linearization technique of FIG. 11, the SFDR is improved to above the goal of 100 dB/Hz$^{2/3}$ over the bandwidth of 50 MHz-1.0 GHz. The extent of improvement in SFDR with feedback linearization, as a function of frequency, is shown in the bar graph at the bottom of the plot.

The invention claimed is:

1. A method for producing an optical output in substantially linear relationship with an input electrical AC signal, comprising the steps of:
   providing a light-emitting transistor having emitter, base, and collector regions, said light-emitting transistor producing light emission from its base region in response to electrical signals applied with respect to said emitter, base, and collector regions;
   applying a signal derived from said input signal to said light-emitting transistor;
   deriving a feedback signal from an electrical operating signal of said light-emitting transistor;
   applying a predistortion factor to the derived feedback signal to produce a predistorted feedback signal; and
   combining said predistorted feedback signal with said input signal to produce said signal derived from said input signal;
   whereby said light emission comprises an optical output in substantially linear relationship with said input signal.

2. The method as defined by claim 1, wherein said step of applying said predistortion factor comprises applying controllable gain or attenuation of said derived feedback signal.

3. The method as defined by claim 1, wherein said step of applying said predistortion factor comprises applying controllable phase variation of said derived feedback signal.

4. The method as defined by claim 1, wherein said step of applying said predistortion factor comprises applying controllable gain or attenuation of said derived feedback signal and applying controllable phase variation of said derived feedback signal.

5. The method as defined by claim 1, wherein said combining of said predistorted feedback signal with said input signal comprises subtracting said predistorted feedback signal from said input signal.

6. The method as defined by claim 1, wherein said step of providing a light emitting transistor comprises providing a transistor laser, and wherein said optical output comprises a laser output.

7. The method as defined by claim 4, wherein said step of providing a light emitting transistor comprises providing a transistor laser, and wherein said optical output comprises a laser output.

8. The method as defined by claim 1, wherein said step of deriving a feedback signal from an electrical operating signal of said light-emitting transistor comprises deriving an electrical current from said light-emitting transistor.

9. The method as defined by claim 8, wherein said step of deriving said feedback signal further comprises amplifying said electrical current derived from said light-emitting transistor.

10. The method as defined by claim 9, wherein said step of providing a light-emitting transistor comprises providing a heterojunction bipolar light-emitting transistor, and wherein said step of amplifying said electrical current comprises amplifying said current using at least one heterojunction bipolar transistor.

11. The method as defined by claim 10, further comprising forming said heterojunction bipolar light-emitting transistor and said at least one heterojunction bipolar transistor using a common semiconductor layer structure.

12. The method as defined by claim 9, wherein said step of deriving a feedback signal from an electrical operating signal of said light-emitting transistor comprises deriving said electrical operating signal from the collector current of said light-emitting transistor.

13. A feedback linearization apparatus for producing an optical output in substantially linear relationship with an input electrical AC signal, comprising:
   a light-emitting transistor having emitter, base, and collector regions, said light-emitting transistor being operative to produce light emission from its base region in response to electrical signals applied with respect to said emitter, base, and collector regions;
   a difference circuit, which receives, as its positive input, said input signal, and as its negative input, a predistorted feedback signal, the output of said difference circuit being applied to said light-emitting transistor; and
   a feedback circuit responsive to an electrical operating signal of said light emitting transistor for producing said predistorted feedback signal;
   whereby said light emission comprises an optical output in substantially linear relationship with said input signal.

14. The feedback linearization apparatus as defined by claim 13, wherein said light emitting transistor is a laser transistor having an optical resonant cavity enclosing at least a portion of said base region, and wherein said light emission comprises laser emission.

15. The feedback linearization apparatus as defined by claim 14, wherein said feedback circuit is operative to produce said predistorted feedback signal as a version of said electrical operating signal to which predetermined gain or attenuation control and predetermined phase control has been applied.

16. A feedback linearization method for producing an optical output in substantially linear relationship with an input electrical AC signal, comprising the steps of:

providing a transistor laser having emitter, base, and collector regions, and an optical resonant cavity enclosing at least a portion of said base region, said transistor laser producing laser emission from its base region in response to electrical signals applied with respect to said emitter, base, and collector regions;

applying a signal derived from said input signal to said transistor laser;

deriving a feedback signal from an electrical operating signal of said transistor laser;

applying a predistortion factor to the derived feedback signal to produce a predistorted feedback signal; and combining said predistorted feedback signal with said input signal to produce said signal derived from said input signal;

whereby said laser emission comprises an optical output in substantially linear relationship with said input signal.

17. The method as defined by claim 16, wherein said step of applying said predistortion factor comprises applying controllable gain or attenuation of said derived feedback signal.

18. The method as defined by claim 16, wherein said step of applying said predistortion factor comprises applying controllable phase variation of said derived feedback signal.

19. The method as defined by claim 16, wherein said step of applying said predistortion factor comprises applying controllable gain or attenuation of said derived feedback signal and applying controllable phase variation of said derived feedback signal.

20. The method as defined by claim 16, wherein said combining of said predistorted feedback signal with said input signal comprises subtracting said predistorted feedback signal from said input signal.

21. The method as defined by claim 20, wherein said step of deriving a feedback signal from an electrical operating signal of said transistor laser comprises deriving an electrical current from said transistor laser.

22. The method as defined by claim 21, wherein said step of deriving said feedback signal further comprises amplifying said electrical current derived from said transistor laser.

23. The method as defined by claim 21, wherein said step of providing a transistor laser comprises providing a heterojunction bipolar transistor laser, and wherein said step of amplifying said electrical current comprises amplifying said current using at least one heterojunction bipolar transistor.

24. The method as defined by claim 23, further comprising forming said heterojunction bipolar transistor laser and said at least one heterojunction bipolar transistor using a common semiconductor layer structure.

* * * * *